April 23, 1968   R. E. HARRINGTON   3,379,918
METHOD FOR PRODUCING HIGH BRIGHTNESS AND LOWER ELECTRODE
CONSUMPTION RATE IN CARBON ARCS
Filed July 27, 1964

INVENTOR.
ROGER E. HARRINGTON
BY
ATTORNEY

United States Patent Office 3,379,918
Patented Apr. 23, 1968

3,379,918
METHOD FOR PRODUCING HIGH BRIGHTNESS AND LOWER ELECTRODE CONSUMPTION RATE IN CARBON ARCS
Roger E. Harrington, Lakewood, Ohio, assignor to Union Carbide Corporation, a corporation of New York
Filed July 27, 1964, Ser. No. 385,120
7 Claims. (Cl. 314—29)

ABSTRACT OF THE DISCLOSURE

A method of improving the performance of a high intensity light source which includes dispersing a liquid such as water into the contacting area between the positive electrode and the jaws holding it in place. Providing a hole in the wall of the electrode jaws and passing a liquid therethorugh is the preferred embodiment of the invention.

---

This invention relates in general to carbon arc illumination and more particularly to a method of obtaining an increase in the quantity of light which is obtainable from a carbon arc and for obtaining an improvement in the efficiency of operation of the arc.

Arc carbon electrodes are empolyed in devices wherein the light which is in the crater region of a positive carbon is employed as a source of illumination. These devices generally require that the source of illumination function for an indefinitely long duration of time as, for example, in a solar simulation device, or that it function for a definite period of time such as in certain searchlight apparatus. In either case, providing sufficient lengths of the positive and negative carbons to sustain an arc for the desired duration is accomplished by joining carbons together.

The consumption rate of the carbons is an important factor to be considered in determining the overall system efficiency and operating cost for any particular duration of operating time. Efforts in the art are continually directed toward improvements which would provide a lower consumption rate of the carbon electrodes and at the same time maintain high arc performance.

In addition to the importance of the efficiency of operation of the carbon arc, other characteristics of the arc must be considered when the total performance is evaluated. For example, the quantity of light which may be produced in an arc is a prime consideration. Although high intensity arc carbons are operated at high current densities, there is a maximum current density beyond which the arc becomes unsteady. For example, a standard 11 millimeter high intensity positive arc electrode begins to produce an irregular arc at about 200 to 210 amperes. This effect is undesirable since operation at still higher currents would provide a greater total light output from the arc. The maximum power at which the arc carbon can operate at a reasonably steady condition is referred to as its power rating. Quite obviously, the more light an arc can generate, the more useful the arc becomes. It is, therefore, highly desirable that the arc generating system be improved so that this objective may be realized.

Various attempts are made in the art to accomplish these objectives. For example, positive or negative electrode compositions are materially altered until an improvement in performance is realized. As another example, the jaws which hold the electrode in place are water-cooled rather than air-cooled, thereby increasing the rate at which heat is removed and consequently lowering the consumption rate of the electrode. Each of these methods provides some improvement in the overall performance and efficiency of the system, but further improvement is considered essential in view of the continuing need for advances in the arc performance.

Accordingly, it is the principal object of this invention to provide a method whereby the consumption rate of arc carbon electrodes is reduced.

Another primary object of this invention is to provide a method whereby the power rating of a high intensity arc carbon electrode can be increased.

Other objects and advantages of this invention will become apparent from the following description, taken in conjunction with the following drawings, wherein.

Broadly, the objects of the invention are accomplished by permitting a liquid to flow into the area of contact between a carbon electrode and the jaws which maintain the electrode in position. Preferably, the means whereby the liquid is permitted to flow into the desired region comprises providing liquid-cooled jaws with a small opening to permit the liquid to flow from within the jaws into the contacting area. The liquid, when it is in the desired area, provides an improved thermal contact between the electrode and the jaws. This liquid may be any one of a variety of suitable liquids which are hereinafter further described. However, for obvious reasons of economy, water is the preferable liquid, and will be continually referred to in the further description of the invention.

The invention will be more readily understood by referring to the following drawings which illustrate the preferable method of accomplishing the invention.

Figure 1:
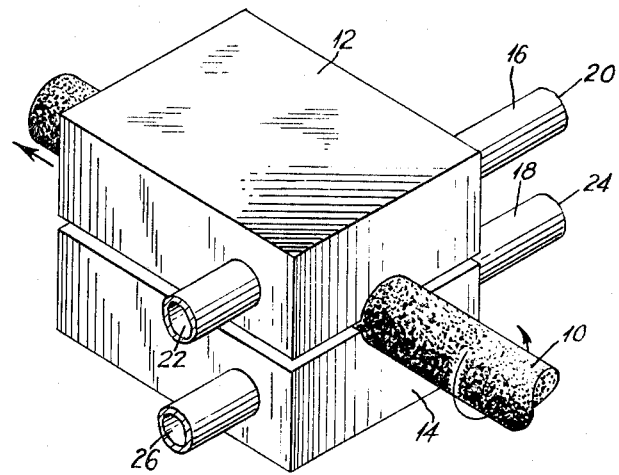
FIGURE 1 is an isometric view of an electrode residing in liquid cooled jaws, thereby illustrating essentially one-half of an arc generating system.

Referring now to FIGURE 1, a carbon electrode 10 is disposed between the liquid cooled jaws 12 and 14. Each of the jaws 12 and 14 has a conduit, 16 and 18 respectively, incorporated as an integral part thereof. A liquid, preferably water, enters the conduit 16 at the opening 20 in one end and egresses at the other end at the opening 22. In a similar manner, water enters the conduit 18 at the opening in one end 24 and egresses at the other end at the opening 26.

In operation, the electrode 10 is rotated and is moved through the jaws 12, 14, in the directions indicated by conventional well known means which are not shown. Water or other liquid enters the conduits 16, 18 at the proper openings 20, 24 and flows through the hollow jaws and out of the conduits at 22 and 26. In this manner the electrode 10 is cooled. While passing through the hollow jaws, a part of the water is allowed to egress at points within the jaws (30, 32 in FIGURE 2, for example) and flow into the area of contact between the electrode and jaws. The combination of electrode motion and surface tension causes the water which enters the contacting area to be distributed along the section of electrode which is within the jaws. Thus, a very effective thermal contact between jaw and electrode is provided whereby heat may be more effectively conducted away from its source of concentration thereby permitting either, as desired, an increase in power which may be applied resulting in more light, or alternatively, the maintenance of the same power with a resulting lower consumption rate of the electrode.

Figure 2:
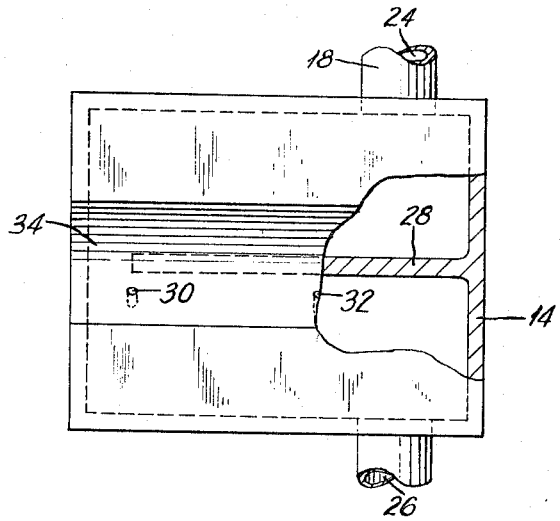
FIGURE 2 is a partial sectional top view of one of the liquid cooled jaws illustrated in FIGURE 1.
Figure 3:
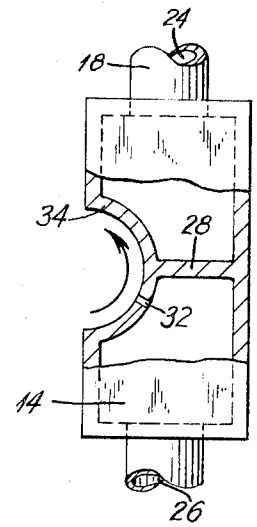
FIGURE 3 is a partial sectional side view of the liquid-cooled jaw illustrated in FIGURE 2.

The operation may be more fully understood by reference to FIGURES 2 and 3. FIGURE 2 provides an advantageous view of the internal structure of the jaw 14 which is illustrated in FIGURE 1. FIGURE 3 is a side view of FIGURE 2. In FIGURES 2 and 3, the jaw 14 comprises a conduit 18, a baffle 28, small openings 30 and 32, and a semi-circular groove 34. The water which is introduced at the opening 24, flows around the end of the baffle 28 and emerges at the opening 26. Due to the surrounding pressure, a part of the water egresses at 30 and 32 and travels along the groove 34, which under normal operating conditions is in intimate contact with the electrode 10.

The size of the small openings 30, 32 are preferably in the range of from about 0.013 inch to about 0.020 inch diameter. The average flow rate of liquid with this diameter range is approximately 120 cc./minute or 7 liters/hour. This particular average flow rate of the liquid is sufficient to maintain liquid in the contacting area continously. The diameter size of the small openings may be increased beyond 0.020 inch, but the advantage of the attendant increase in flow rate is not readily apparent.

It is understood that the jaw 12 and 14 are identical in structure. Therefore, each jaw will have like openings to permit the water to flow into the desired area. It is, of course, not absoutely necessary for the openings to be present in both jaws but it is obvious that the water may be dispersed more readily and the jaws may be manufactured with greater economy if they are so located. For the same reason of ease of dispersement, two small opnenings in each jaw rather than one are illustrated. However, any number of small openings in either jaw is sufficient to accomplish the objects of the invention.

The locations of the small openings in the jaws are optional. Best results appear to be accomplished when the openings are located at a position which will most advantageously allow the water pressure and rotation of the carbon electrode to disperse the water over as wide a contact area as possible.

As hereinbefore indicated, the liquid need not be water. For example, ethylene glycol might, because of its higher boiling point, provide better results than water. However, this liquid is expensive and would require a recirculation system to reduce the quantity of liquid which is required. Any liquid is suitable which does not burn or crack, thereby leaving nongaseous residues, when in contact with the hot carbon electrode. In addition, the liquid should not react with or harmfully corrode either the carbons, additives thereto, or the jaws.

The jaws as illustrated are intended to be representative of the liquid cooled jaws which are used in the art and the structure, as such, forms no part of this invention. It is therefore apparent that the liquid cooled jaws may be in any desirable shape or size, and of any suitable construction without affecting the objectives of this invention. Since it is imperative that water or other suitable liquid be provided in the contacting region between electrode and jaw, the use of liquid cooled jaws as a convenient and preferable method is obvious. However, any suitable method of providing a liquid in the desired region is acceptable. For example, a separate supply of water may be used and water may then be released near the contacting surfaces. This method would depend entirely on surface tension and electrode motion to disperse the water and is clearly not as suitable as the preferred method illustrated herein.

Various combinations of positive carbon electrode construction, jaw material, and size of opening in the walls of the jaws which are set forth in the following Examples 1, 2, and 3 were tested to determine the effectiveness of the subject invention.

The tests consisted of placing the desired combination in a Mole Richardson test lamp. A ¾ inch arc gap was used with a 55 degree inclination of the negative carbon with respect to the positive carbon axis. The outside diameter of the positive carbons was 10 millimeters for the three examples.

Arc current and voltage were recorded on a Moseley $x-y$ recorder. To measure the center crater brightness of the positive carbon, a crater image was formed on the wall 35.1 feet from the crater position using a simple quartz lens (2.5 diopter). At this distance, the magnification is 24.8. A regular Weston Type III photocell was employed to measure the illumination on the image. A 1.05 inch aperture was placed over the photocell so that the actual crater area used to measure center crater brightness was a circle 1.07 mm. in diameter. The same photocell was used to measure total crater candlepower by replacing the projection lens with an aperture shield. The diameter of the hole in the aperture shield was calculated to permit the photocell to see 1.1 times the nominal crater diameter.

Consumption rates were obtained by measuring the length of carbon protruding from the back of the lamp house at the start and end of the run. By using a stop watch to time the run, good consistency in consumption rate measurements were obtained, even for times of one minute, the minimum time required to record all the data (i.e., current, voltage, center brightness, candle power and consumption rate).

A reversing switch was installed in a feed motor circuit. Normally the feed and rotation motors run in opposition so that the carbon can be rotated at a normal rate and fed forward at rates from 0 to 90 inches per hour. By reversing the direction of rotation of one motor, carbon feed rate could then be varied between 50 and 250 inches per hour. thus extending the total range of feed rates obtainable from 0 to 250 inches per hour.

The data which were gathered from these tests were analyzed and are conveniently presented in the following tables.

EXAMPLE 1

A positive carbon comprising a core consisting of approximately 50% rare earth salts and 50% (by weight) graphite with minor amounts of additives and a shell of graphite was used as the control electrode. The core diameter was 0.238″, which was approximately 61% of the diameter of the electrode. Water-cooled silver jaws which were equipped with copper plated graphite inserts were used, each jaw having a single small opening of 0.020 inch diameter. The positive carbon protruded ½ inch beyond one edge of the water cooled jaws at its burning end. The carbons were tested at varying currents and voltages from 148 amperes and 62.8 volts to 202 amperes and 82.5 volts without water in contacting area and from 137 amperes and 61.4 volts to 187 amperes and 81.5 volts with water in contacting area.

EXAMPLE 2

A positive carbon electrode having the same construction as that of Example 1 was used. Water-cooled jaws which were made of silver material were employed. Each jaw had 2 small openings of 0.013 inch diameter drilled therein. Again a ½ inch protrusion of the carbon at its burning edge was employed. The carbons were tested at varying currents and voltages from 147 amperes and 62.5 volts to 207 amperes and 81.1 volts without water in the contacting area and from 136 amperes and 62.3 volts to 187 amperes and 83.1 volts with water in the contacting area.

EXAMPLE 3

A positive carbon electrode having the same construction as those in Examples 1 and 2 except that a core diameter of 0.290", which was 74% of the electrode diameter, was employed. The water-cooled jaws of Example 2 were used in this test also. In this example, a protrusion of ⅜ inch of the carbon at its burning edge was used. The positive carbons were tested from 191 amperes and 64.7 volts to 339 amperes and 81.1 volts without water in the contacting area and from 190 amperes and 69.0 volts to 384 amperes and 85.3 volts with water in the contacting area.

TABLE 1

| Center Crater Brightness (c./mm.$^2$) | Ratio: (Consumption rate with water in contacting area) / (Consumption rate without water in contacting area) | | |
|---|---|---|---|
| | Example 1 | Example 2 | Example 3 |
| 800 | .83 | .76 | |
| 1,000 | .84 | .79 | |
| 1,200 | .83 | .80 | .94 |
| 1,400 | .80 | .78 | .86 |
| 1,600 | .74 | .75 | .78 |
| 1,800 | .67 | .69 | .72 |
| 1,950 | | .64 | |
| 2,000 | .66 | | .66 |
| 2,080 | | | .64 |

TABLE 2

| | Maximum Center Brightness (c./mm.$^2$) | | |
|---|---|---|---|
| | With Water in Contact Area | Without Water in Contact Area | Percent Increase |
| Example 1 | 2,200 | 2,000 | 10 |
| Example 2 | 2,200 | 1,950 | 12.8 |
| Example 3 | 2,690 | 2,080 | 29.3 |

The results which are illustrated in the foregoing tables clearly indicate the effectiveness of the invention. For example, the ratios which are listed in Table 1 show an improvement in the consumption rate of the carbon electrode in all cases of applied power for all three examples. At a maximum center crater brightness of 2000 c./mm.$^2$, for example, the consumption rate of the electrode was reduced by 36% by carrying out the method of the invention. Of comparable importance is the fact that the consumption rate is decreased to a greater degree as the brightness of the arc increases, thereby enabling both objectives of the invention to be realized. Table 2 shows that a significant improvement in the maximum brightness of the arc was obtained in all of the examples. It is noteworthy that an increase of almost 30% was obtained in center brightness with the arrangement prescribed in Example 3.

Although only one type of positive carbon electrode having the described core and shell construction has been employed in the foregoing tests, the same results will be achieved with other electrodes varying in shell and core compositions. Thus, coke or lampblack may be substituted for graphite as the shell material or as the core material. Cores containing rare earth salts in the range of from about 40% to 75% by weight are also quite suitable. Furthermore, the invention is equally applicable to negative carbon electrodes as well as positive carbon electrodes.

With the introduction of water into the contacting region between the jaws and the electrode, the condensation of volatiles from the carbon on the cooled surface of the jaws is greatly reduced, thus produing an important improvement in jaw cleanliness and therefore, in the efficiency of operation. In addition, the lubricating effect of the liquid in the contacting region reduces the friction between the electrode and jaw surfaces, thus mitigating the problem of "joint breakage" which is prevalent when carbons are joined end to end.

From the foregoing, it will be appreciated that the invention provides an improvement in the efficiency of operation of a carbon arc by reducing the consumption rate of the carbon electrodes which are employed in the production of the arc. In addition, the invention affords an opportunity to obtain and increase in quality of light in the arc by the application of an increase in power to the system without adversely affecting the quality of the arc.

What is claimed is:

1. In a method for producing a high intensity light in a carbon arc light source comprising spaced positive and negative electrodes enclosing said positive electrode in jaws and the improvement which comprises dispersing a liquid in the contacting area between said positive electrode and said jaws.

2. The method of claim 1 wherein said liquid is water.

3. The method of claim 1 wherein said liquid is ethylene glycol.

4. In a method for producing a high intensity light in a carbon arc light source comprising positive and negative spaced electrodes each disposed in jaws, the improvement which comprises providing at least one opening in the wall of said positive jaw and passing a liquid out of said opening from said jaw into the area between said electrode and said jaw during the operation of said source.

5. The method of claim 4 wherein said liquid is water.

6. The method of claim 4 wherein said liquid is ethylene glycol.

7. The method of claim 4 wherein said opening is from about 0.013 inch diameter to about 0.020 inch diameter.

References Cited

UNITED STATES PATENTS

| 1,129,377 | 2/1915 | Bronn, et al. | 13—18 |
| 3,304,460 | 2/1967 | Cargill et al. | 314—21 |

FOREIGN PATENTS 354,539  1932  Canada.

BERNARD A. GILHEANY, *Primary Examiner.*

R. N. ENVALL, JR., *Assistant Examiner.*

UNITED STATES PATENT OFFICE
CERTIFICATE OF CORRECTION

Patent No. 3,379,918                            April 23, 1968

Roger E. Harrington

It is certified that error appears in the above identified patent and that said Letters Patent are hereby corrected as shown below:

Column 6, line 24, beginning with "1. In a method" cancel all to and including "said jaws." in line 29, same column 6, and insert > 1. In a method for producing a high intensity light in a carbon arc light source comprising spaced positive and negative electrodes the improvement which comprises enclosing said positive electrode in jaws and dispersing a liquid in the contacting area between said positive electrode and said jaws.

Signed and sealed this 18th day of November 1969.

(SEAL)
Attest:

EDWARD M. FLETCHER, JR.                    WILLIAM E. SCHUYLER, JR.
Attesting Officer                              Commissioner of Patents